United States Patent
Bruckner et al.

(10) Patent No.: US 10,389,806 B2
(45) Date of Patent: Aug. 20, 2019

(54) METHOD FOR ASYNCHRONOUS DATA COMMUNICATION IN A REAL-TIME CAPABLE ETHERNET DATA NETWORK

(71) Applicant: B&R INDUSTRIAL AUTOMATION GMBH, Eggelsberg (AT)

(72) Inventors: Dietmar Bruckner, Anthering (AT); Franz Prenninger, Helpfau-Uttendorf (AT); Bernadette Avramov, Uttendorf (AT)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 133 days.

(21) Appl. No.: 15/281,719

(22) Filed: Sep. 30, 2016

(65) Prior Publication Data

US 2017/0099351 A1    Apr. 6, 2017

(30) Foreign Application Priority Data

Oct. 1, 2015  (AT) .............................. A 50832/2015

(51) Int. Cl.
*G06F 15/16* (2006.01)
*H04L 29/08* (2006.01)
(Continued)

(52) U.S. Cl.
CPC ...... *H04L 67/1095* (2013.01); *H04L 12/4035* (2013.01); *H04L 61/6022* (2013.01)

(58) Field of Classification Search
CPC .......... H04L 12/40156; H04L 12/4035; H04L 2012/4026; H04L 41/12; H04L 47/82
See application file for complete search history.

(56) References Cited

U.S. PATENT DOCUMENTS

| 5,440,555 A | 8/1995 | Morihisa |
| 5,841,777 A | 11/1998 | Chhen |

(Continued)

FOREIGN PATENT DOCUMENTS

| DE | 10 2012 210243 | 12/2013 |
| EP | 0 584 820 | 3/1993 |

(Continued)

OTHER PUBLICATIONS

EP Search Report issued in Application No. 16 19 1513 (8 pages).
Austrian Search Report dated Aug. 10, 2016 and issued in Application No. A 50832/2015.

*Primary Examiner* — Dhairya A Patel
(74) *Attorney, Agent, or Firm* — Greenblum & Bernstein, P.L.C.

(57) ABSTRACT

According to the invention, in order that the asynchronous bandwidth available in a real-time capable Ethernet data network protocol can be better utilized without collision at least one slave (S1, . . . , Sn) which wishes to transmit asynchronous data informs the master (M) in a transmission cycle (Z(m)) by means of a request data packet (DPa) how much asynchronous data this slave (S1, . . . , Sn) wishes to transmit asynchronously and by means of an invitation data packet (DPe) the master (M) informs the slave (S1, . . . , Sn) as to the time ($t_{as}$) within a following transmission cycle (Z(m+k+l)) at which the slave (S1, . . . , Sn) should transmit the asynchronous data in an asynchronous data packet (DPas).

17 Claims, 4 Drawing Sheets

Figure 1:
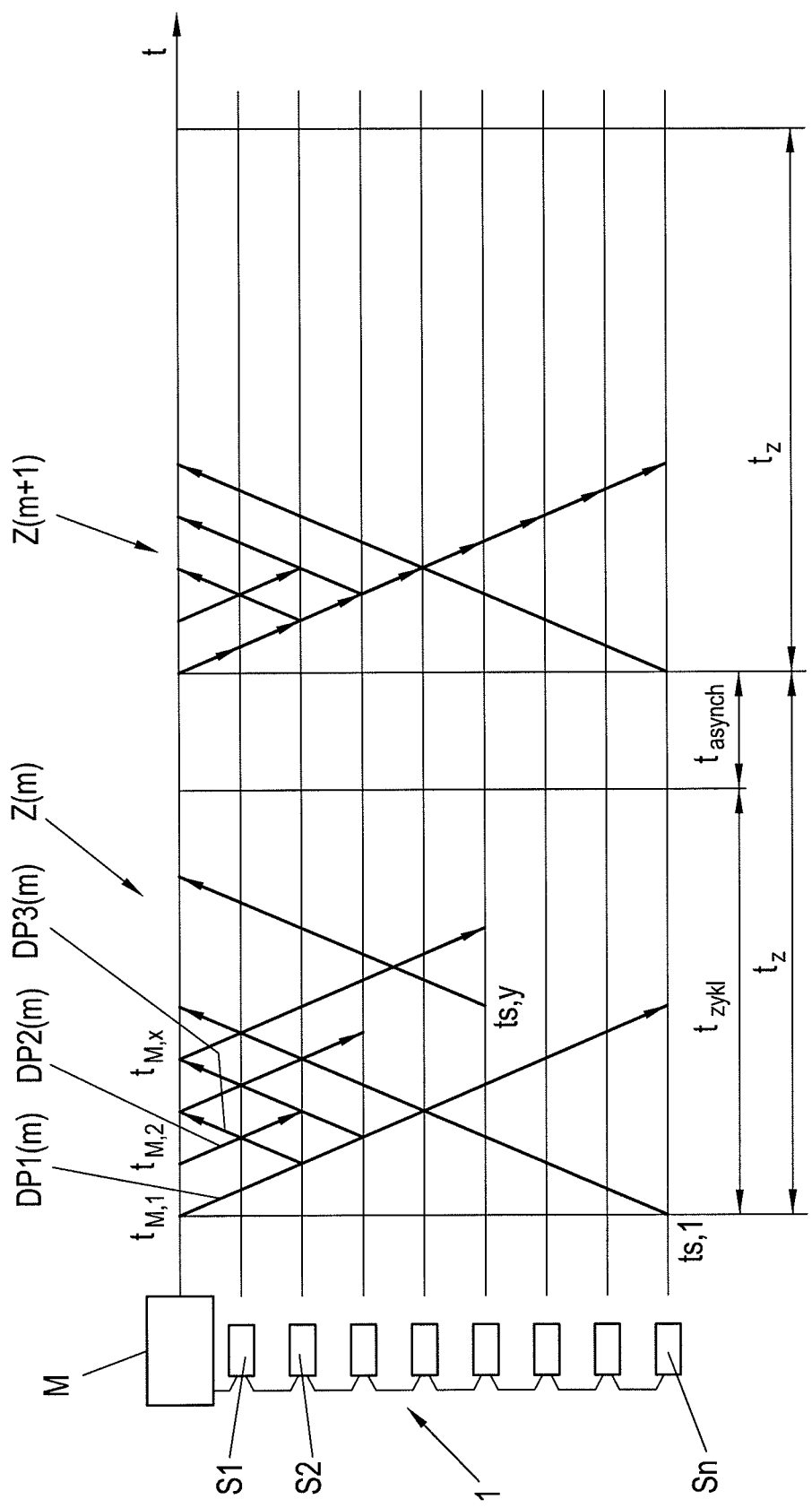

(51) Int. Cl.
*H04L 12/403* (2006.01)
*H04L 29/12* (2006.01)

(56) References Cited

U.S. PATENT DOCUMENTS

| | | | |
|---|---|---|---|
| 5,875,184 A | 2/1999 | Altvater | |
| 6,320,871 B1* | 11/2001 | Mizuguchi | H04L 12/433 370/452 |
| 7,941,660 B2* | 5/2011 | Lu | H04L 43/10 713/151 |
| 9,585,053 B2 | 2/2017 | Scheffel | |
| 2003/0214953 A1* | 11/2003 | El-Demerdash | H04L 12/403 370/400 |
| 2005/0041690 A1* | 2/2005 | Arnold | H04L 12/6418 370/493 |
| 2006/0251046 A1* | 11/2006 | Fujiwara | H04J 3/0652 370/350 |
| 2007/0230462 A1* | 10/2007 | Nakayama | H04L 12/403 370/389 |
| 2009/0129395 A1* | 5/2009 | Janssen | H04L 12/403 370/400 |
| 2010/0057388 A1 | 3/2010 | Lebrun | |
| 2010/0254407 A1* | 10/2010 | Tanaka | H04J 3/1694 370/468 |
| 2012/0297233 A1* | 11/2012 | Ross | H04N 21/23602 713/502 |
| 2013/0111088 A1* | 5/2013 | Cho | G06F 13/00 710/110 |
| 2013/0117483 A1* | 5/2013 | Boeck | H04L 12/4035 710/110 |
| 2015/0102943 A1 | 4/2015 | De Greef | |
| 2015/0124620 A1 | 5/2015 | Scheffel | |
| 2015/0339257 A1 | 11/2015 | Hug | |
| 2016/0034417 A1* | 2/2016 | Chavez | G06F 1/266 710/110 |

FOREIGN PATENT DOCUMENTS

| | | |
|---|---|---|
| EP | 0 827 308 | 3/1998 |
| WO | 98/26515 | 6/1998 |
| WO | 2013/178274 | 12/2013 |

\* cited by examiner

METHOD FOR ASYNCHRONOUS DATA COMMUNICATION IN A REAL-TIME CAPABLE ETHERNET DATA NETWORK

This application claims priority under 35 U.S.C. § 119(a) of Austrian Application No. A50832/2015 filed Oct. 1, 2015, the disclosure of which is expressly incorporated by reference herein in its entirety The present invention relates to a method for asynchronous data communication in a real-time capable Ethernet data network, in which at least one master is connected by means of the Ethernet data network to a plurality of slaves and for the Ethernet data communication a transmission cycle with a predetermined cycle time is predetermined, wherein the transmission cycle is divided into an isochronous segment and an asynchronous segment and the real-time data communication is implemented in the isochronous segment and the asynchronous segment is used for asynchronous data communication between master and slave.

In a data network for data communication, a network protocol is implemented, with which data is transferred in data packets in the data network between the network nodes which are connected to the data network. Probably the best known and most widespread network protocol is the Ethernet protocol. Hereto, Ethernet defines data packets (also called data frame or Ethernet frame), in which data of a higher-level communication protocol can be transferred encapsulated in an Ethernet data packet. In doing so, data of the communication protocol can be transferred in an Ethernet data packet with a data length between 46 and 1500 bytes. Addressing in the Ethernet protocol is effected by means of MAC (Media Access Control) addresses of the network nodes which are clearly allocated for every network device. As seen from the perspective of the known OSI model, Ethernet is exclusively implemented on layers 1 and 2. In the higher layers, different communication protocols can be implemented. Hereby, a multiplicity of communication protocols has been established, for example IP in layer 3 or TCP and UDP in layer 4 to name but a few of the most widespread communication protocols.

With regard to hardware, today's Ethernet systems are so-called switched data networks, in which individual network nodes do not have to be connected with one another and do not have to be able to communicate with one another, but can instead be connected by means of coupling elements, so called switches or network hubs. For such purpose, a coupling element has a number of network ports for the option of connecting a network participant (either a network node or a different coupling element). Such a coupling element forwards an Ethernet data packet either to all ports (hub) or to (one) specific port(s) (switch). Thus, so-called point-to-point connections are created in a switched data network, in which Ethernet data packets are forwarded from one network node to a different network node by means of a number of coupling elements.

Network nodes which are used in the industrial automation often have a built-in internal S-port switch, wherein two ports are accessible from outside and the third port serves the internal interconnection. As a result, without additional external coupling elements, line topologies can be realized, in which a network node is connected to the next adjacent network node in the form of a line, which is advantageous in an industrial environment for reducing the cabling effort. However, it is self-evident that external network switches or external network hubs can also be used for the setup of the network topology. Basically, any network topology is possible, i.e. particularly a star topology, a line topology, a tree topology, a ring topology, etc. as well as any combination thereof. As a rule, a ring topology, as is known in general, requires specific precautions in order to prevent the uncontrolled circulation of multiple-address data packets.

In order to be able to also use Ethernet for industrial automation, real-time capable Ethernet protocols have already been developed because the standard Ethernet protocol is known to not be real-time capable. Examples of known real-time capable Ethernet network protocols are Modbus/TCP, Ethernet/IP, ProfiNET IRT, EtherCAT, or Ethernet POWERLINK, to name but a few. In this context, often also the term industrial Ethernet is used. These real-time capable Ethernet protocols are supposed to ensure data communication that is sufficiently fast and deterministic for the corresponding application. They are thus supposed to ensure that a real-time relevant data packet is transferred via the network within a predetermined interval from a transmitting network node to a receiving network node. In an industrial automation environment, real-time capability means, e.g. that a fixed interval must be observed between the acquisition of a measured value, transfer of the measured value to a control unit, calculation of an actuating value in the control unit based on the measured value, and transfer of the actuating value to an actuator for executing an operation. With reference to the real-time capable Ethernet data network for transferring these data via the real-time capable Ethernet data network a predetermined interval of the data transmission must be ensured.

In an industrial automation environment, there is generally as least one master network node (hereinafter also called master for short) which communicates with at least one associated, but usually a plurality of associated slave network nodes (hereinafter also called slaves for short). For realizing a real-time capable Ethernet data network, the known real-time capable Ethernet network protocols have defined a transmission cycle having a predefined cycle time, within which the master can communicate with each slave. This normally comprises cyclically the possibility of a data packet from the master to every slave and conversely also at least one data packet from a slave, normally at least one data packet from each slave to the associated master. The attainable and beforehand ascertainable minimal cycle time results from the sum of the maximum run times of the data packets. The run times are substantially hardware-dependent and result from bit transmission times (length, payload) of the data packets, network infrastructure (e.g. delays due to coupling elements), and the network topology. The above-mentioned limits regarding the size of the Ethernet data packets must also be taken into account.

The known real-time capable Ethernet protocols differ in the specific implementation of this cyclical data traffic (also designated as isochronous data traffic). ProfiNet and Ethernet/IP for example send individual Ethernet data packets from the master to each slave and vice versa. On the other hand, EtherCAT merely uses a sum frame method, wherein the master sends a data packet with data for all slaves to the first slave. This latter reads its data out of the data packet and overwrites these data with data which the slave may transmit to the master. This modified data packet is then transmitted to the second slave, etc., until in the reverse sequence the data packet from the last slave is again transmitted to the master. In another known implementation of the sum frame method the data packet is truncated in the direction from the master to the slave, and each slave takes its data from the data packet and lengthens it in the reverse direction, as each slave adds its data to the data packet to the master. Such a sum frame method is supported by ProfiNet IRT (dynamic frame packing). However, for implementation of this cyclical data traffic EtherCAT and ProfiNet IRT require special components and cannot be achieved with standard Ethernet coupling elements. POWERLINK sends a data packet from the master as sum frame to all slaves and the master receives a separate Ethernet data packet back from each slave. POWERLINK can be operated with standard Ethernet coupling elements. Thus the aforementioned methods likewise differ substantially from one another in the requirements for the hardware used.

This cyclical (isochronous) data traffic, which constitutes the basis of the real-time capability in the real-time capable Ethernet network protocol, is usually expanded in each transmission cycle by asynchronous (non-cyclical) data packets. Such asynchronous data packets are used by the data communication which is not subject to the real-time requirements, for example for configuration of the slaves, for visualization purposes or for status enquiries. Bandwidth is reserved for such asynchronous data packets, i.e. a specific, defined time is available in each transmission cycle for asynchronous data traffic. However, the network nodes must sub-divide this asynchronous segment of a transmission cycle, and there are various approaches for this in the known real-time capable Ethernet protocols.

Therefore, the known real-time capable Ethernet protocols also differ regarding implementation of the asynchronous data traffic. ProfiNet enables the arbitrary transmission of asynchronous data packets and for this purpose uses a prioritization by which it is specified how asynchronous data packets are initially treated. This enables the coupling elements to transmit higher-priority data packets more quickly and even to interrupt the transmission of lower-priority data packets, if required, in order to give preference to higher-priority data packets. However, this requires large data buffers in the coupling elements, in order to be able to store data temporarily until they are transmitted in asynchronous data packets. Moreover, the coupling elements therefore also require a certain "intelligence" in order to be able to undertake this prioritization, so that no standard coupling elements, such as a conventional Ethernet network switch, can be used. EtherCAT keeps an area free in the sum frame for asynchronous data and the master organizes who may use this area. In the case of POWERLINK, a slave is invited by the master to transmit asynchronous data. Both in the case of EtherCAT and also in the case of POWERLINK the slave signals to the master beforehand that it may transmit asynchronous data. Thus the data buffer in the coupling elements can be saved for asynchronous data.

In the industrial automation environment on the basis of real-time capable Ethernet network protocols the importance of asynchronous bandwidth increases, because on the one hand the real-time capable Ethernet networks become increasingly large (in the sense of having ever more network nodes), and on the other hand the network nodes used offer ever more functions which do not have to be invoked cyclically (for example web servers, events, etc.). Thus more asynchronous data traffic is also necessary. However, the asynchronous bandwidth cannot be increased arbitrarily, since this would increase the cycle time of a transmission cycle, which in turn would have a negative influence on the real-time capability.

Therefore, it is an object of the invention to provide a method by which the available asynchronous bandwidth of a real-time capable Ethernet network protocol can be better utilized without collision for asynchronous data traffic.

This object is achieved according to the invention in that at least one slave which wishes to transmit asynchronous data informs the master, within a transmission cycle by means of a request data packet, how much asynchronous data this slave wishes to transmit asynchronously and the master informs the slave, by means of an invitation data packet, of the time within a following transmission cycle at which the slave is permitted to transmit the asynchronous data. Thus the master controls the entire asynchronous data traffic on the part of the real-time capable Ethernet data network associated with the master. Since the master knows not only that a slave wishes to transmit asynchronous data but also how much asynchronous data is to be sent, the master can precisely plan and carry out the asynchronous data traffic during the current data communication. Thus the available asynchronous bandwidth in each transmission cycle which the network nodes must share can be optimally utilized. Tests with this method on the basis of the POWERLINK Ethernet protocol have revealed that (with otherwise the same preconditions) the asynchronous bandwidth present in the section can in average be better utilized by a factor of between 5 and 10, i.e. that with the method according to the invention between five and ten times as much asynchronous data can be transmitted as in the past.

In addition, for this method no data buffer is required in the coupling elements and no additional requirements are put to the Ethernet hardware. Thus the method can also be carried out with commercially available internal and external coupling elements, such as for example conventional unmanaged network switches.

The master can plan the asynchronous data traffic particularly flexibly if, with the invitation data packet, the master informs the slave of the one of the following transmission cycles in which the slave should transmit the asynchronous data.

It is particularly advantageous if the asynchronous data packet of the slave is transmitted in the transmission cycle which immediately follows the transmission cycle in which the slave has received the invitation data packet. Thus the speed of the asynchronous data traffic can be increased, since the delay time between request and dispatch of the asynchronous data packet decreases. The delay time can be further reduced if the asynchronous data packet is transmitted in the transmission cycle in which the slave has received the invitation data packet.

In order to be able to plan the asynchronous data traffic more flexibly, with the invitation data packet the master can notify the slave as to how much asynchronous data the slave is permitted to send. This also opens up the possibility of distributing the requested data quantity over a plurality of smaller asynchronous data packets.

When in the invitation data packet the master informs the slave of the data quantity, this can also be used in order to recognize an error in the data communication. Then in a simple manner the data quantity of the asynchronous data requested from the slave can be compared with the data quantity of the asynchronous data communicated by the master and in the event of a deviation an error can be assumed.

The request data packet of the slave is preferably transmitted in the isochronous segment of the transmission cycle, since thus each slave has the opportunity in each transmission cycle to communicate to the master that it may transmit asynchronous data packets. Thus it can be ensured that each slave has the opportunity to transmit asynchronous data.

The throughput of asynchronous data can be further increased if the slave is permitted to transmit a plurality of request data packets before it has received an invitation data packet for its request, in particular if it also is permitted to transmit a plurality of request data packets within a transmission cycle, since thus the slave can also transmit a plurality of asynchronous data packets within the following transmission cycles.

In particular, it is advantageous if in the following transmission cycle the slave transmits a plurality of asynchronous data packets in order to be able to make optimal use of the available asynchronous bandwidth.

Likewise, from the perspective of the asynchronous data traffic it is advantageous if the master transmits the invitation data packet in the transmission cycle immediately following the transmission cycle in which the master has received the request data packet. This also helps to reduce the delay time between request and dispatch of the asynchronous data packet.

The master also advantageously has the opportunity to transmit asynchronous data packets within a transmission cycle. Thus asynchronous communication can also be achieved between the master and a slave, for example in order to operate a web server with active elements.

Figure 2:
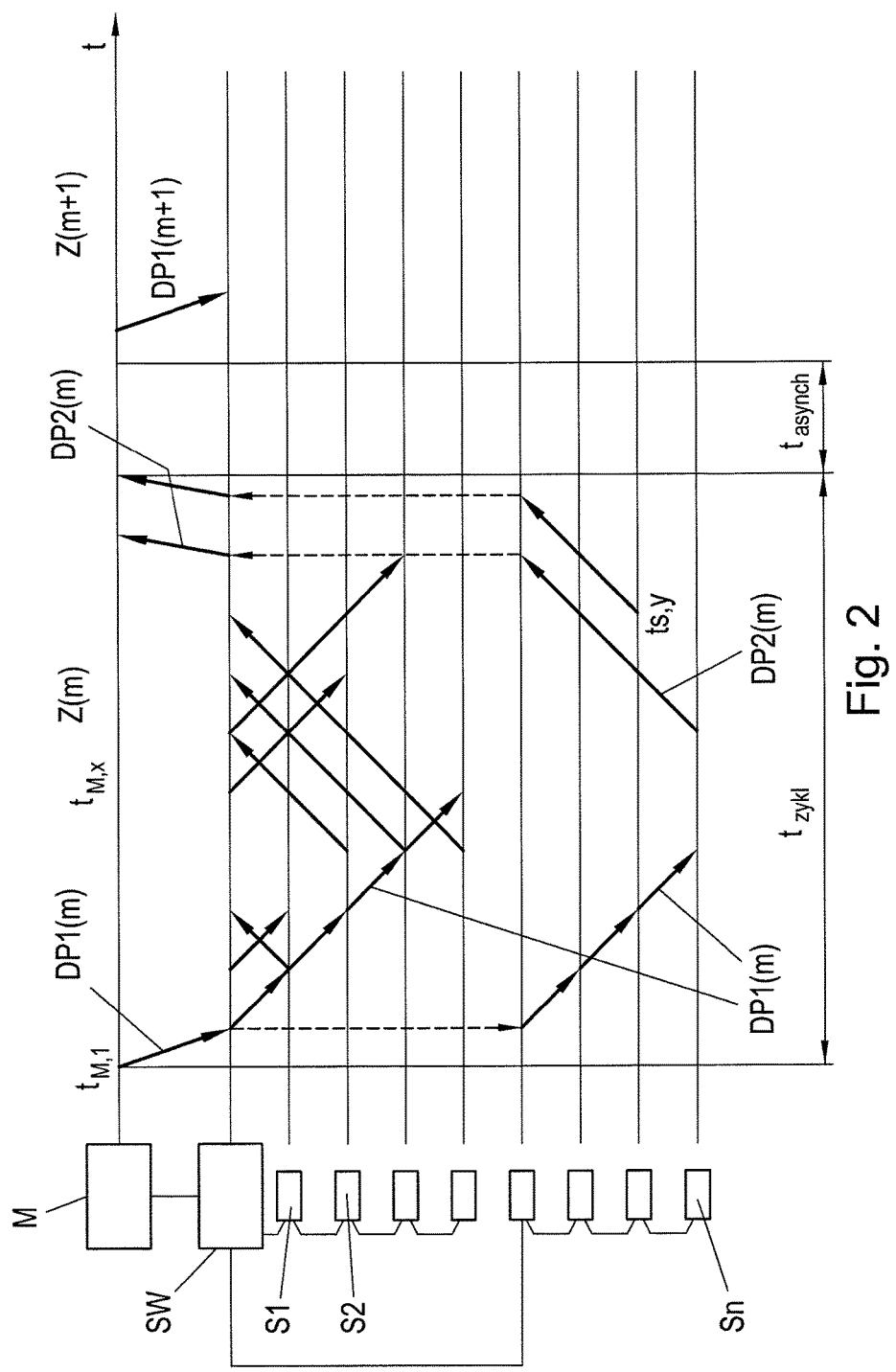
Figure 3:
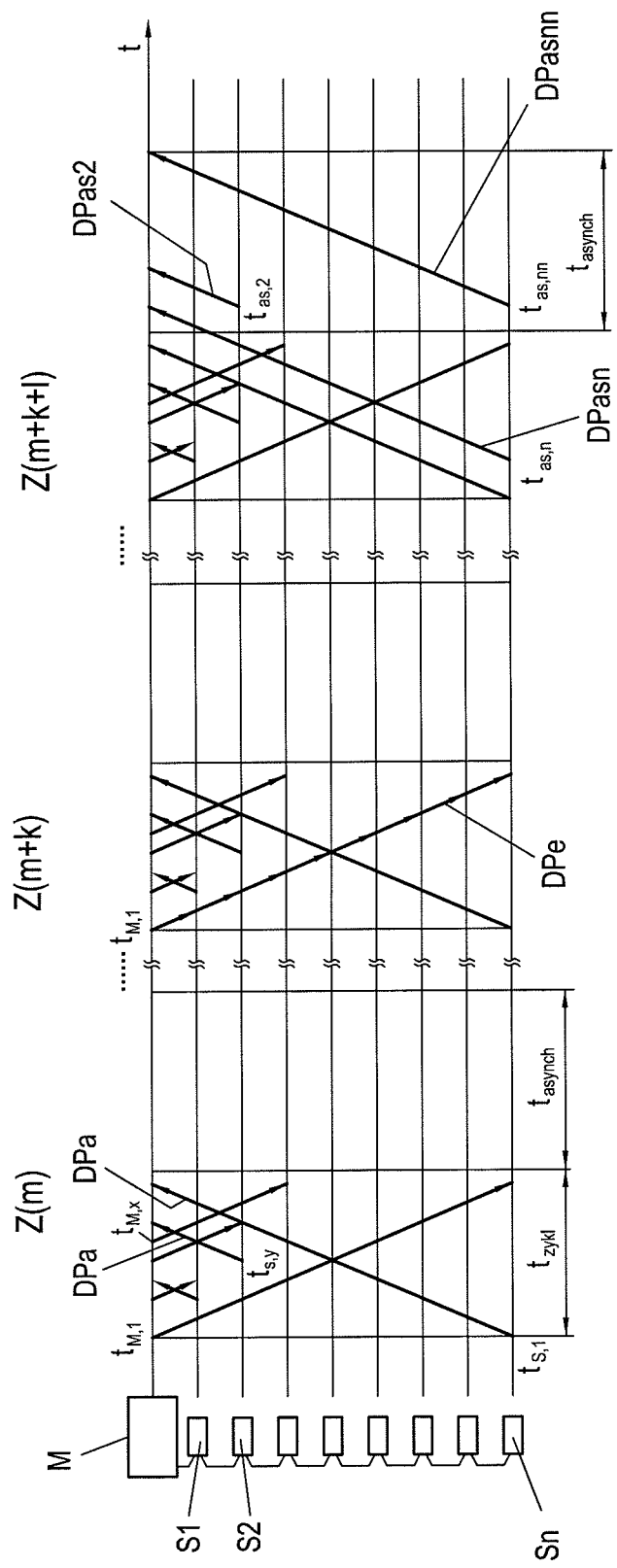
Figure 5:
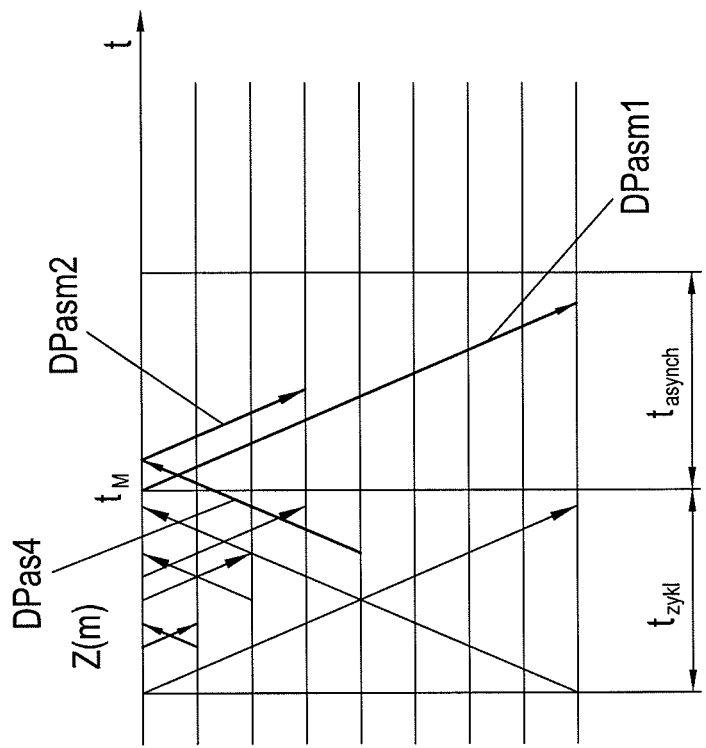
Figure 4:
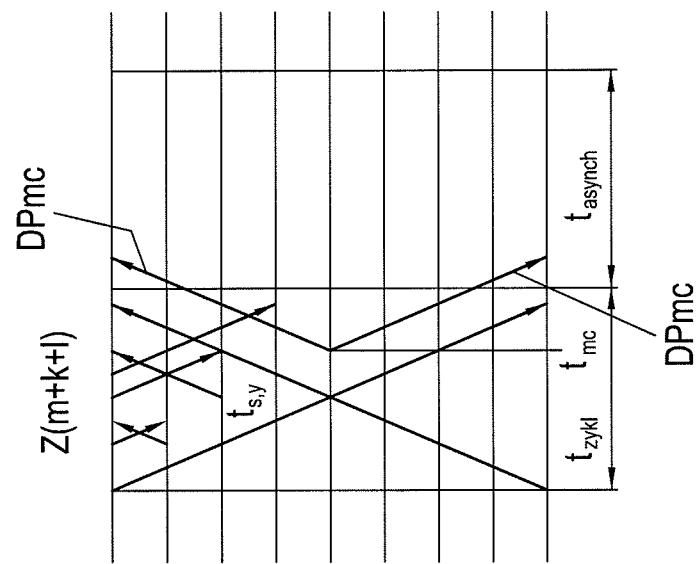

The present invention is explained in greater detail below with reference to FIGS. 1 to 5, which show by way of example, schematically and without limitation, advantageous embodiments of the invention. In the drawings:

FIGS. 1 and 2 show the communication on a real-time capable Ethernet data network, FIG. 3 shows the implementation of the asynchronous data communication according to the invention, FIG. 4 shows the asynchronous data communication according to the invention with a multicast-data packet and FIG. 5 shows the transmission of asynchronous data packets from the master to the slaves.

The realtime-capable Ethernet network protocol underlying the invention is explained using FIG. 1. An exemplary network topology in the form of a linear topology is used in which a master M is connected to a series of series connected slaves S1 . . . Sn to form an Ethernet data network 1. The slaves S1 . . . Sn here are embodied as network devices having an integrated 3-port switch (coupling element) that permits such a linear topology without external coupling elements. The master M is able to communicate in every transmit cycle Z, at prespecified cycle time $t_Z$, with every slave S1 . . . Sn, in that Ethernet data packets DP (hereinafter simply called data packets DP) are sent on the Ethernet data network 1. A sent data packet DP is indicated as an arrow in FIG. 1, wherein the arrow tip indicates the transmit direction (that is, from master M to a slave S or vice versa). Each horizontal line is assigned to a network node (master M or Slave S1 . . . Sn) and represents a timeline. The latency caused by the network when transmitting the data packets DP via the Ethernet data network 1 is indicated by the inclined arrows, wherein the processing period for the data packs DP into the coupling elements and the latency from the finite propagation speed in the medium (copper cable, fiber optics), combined and simplified, are assumed as constant.

A transmission cycle Z is precisely temporally divided in that the times $t_{M,1}, t_{M,2}, \ldots, t_{M,x}, t_{S,1}, \ldots, t_{S,y}$ at which the master M or the slaves S1 . . . Sn may send data packets DP are predefined. In this way it is possible to prevent data collisions on the Ethernet data network 1. However, since Ethernet allows for a full-duplex data communication, it is possible that in a network section, data packets DP are transmitted simultaneously in both directions. This is how each of the subscribing network nodes (master M, slaves S) know the time within a transmit cycle Z at which they may send data packets DP, and when they are to receive some.

These times t within the transmission cycle Z may be planned very precisely in advance if it is known how much data (bytes) are transmitted in one data packet DP. The larger the data packet DP to be expected, the further apart the times t. If the data size is not known in advance, a maximum data size may be assumed, e.g. the maximum frame size for an Ethernet frame. Between two data packets DP also a predetermined pause must be maintained.

The number of network nodes, masters (M) and slaves (S1 . . . Sn), and the size of the sent data are therefore co-determinant for the attainable cycle time $t_Z$.

In FIG. 1, the master M transmits a data packet DP1(m) to the last slave Sn in the transmission cycle Z(m). However, this data packet DP1(m) could also be a summation frame that contains data for all slaves S1 . . . Sn (indicated in the transmission cycle Z(m+1)) and from which the slaves S1 . . . Sn read their data. At an established time thereafter, the master M transmits the next data packet DP2(m), in this case, e.g. to the slave S2. The slave S2 may also transmit a data packet DP3(m) to the master M at the same time. This principle is also maintained by the rest of the network nodes, wherein it is not necessary for every slave S1 . . . Sn to receive or transmit a data packet DP. However, the communication is advantageously planned by the prespecification of the times t such that the data packets DP from the slaves S1 . . . Sn arrive at the master M successively and without a temporal gap (apart a pause that is to be maintained). This communication sequence then repeats itself in the subsequent transmission cycles Z(m+i), wherein the same network nodes do not always have to transmit or receive data packets DP in the same transmission cycle Z, as indicated in FIG. 1.

This planned data communication occurs cyclically and in each transmission cycle Z a temporal segment $t_{zykl}$ is provided for this isochronous data traffic. However, in each transmission cycle Z also a segment $t_{asynch}$ is reserved for asynchronous data traffic in which Ethernet data communication takes place which does not have to satisfy hard realtime requirements. If the cyclical communication differs from transmission cycle to transmission cycle (as is indicated in FIG. 1 between Z(m) and Z(m+1), as an example), then there is at least a maximum periodic time (transmission cycle), within which the isochronous transmit patterns (not necessarily the data contents) repeat precisely, i.e. the cyclic data packets in Z(m) are identical to those in Z(m+a). In each individual transmission cycle Z, however, the ratio between $t_{zykl}$ and $t_{asynch}$ may change, depending on the number of planned cyclic data packets.

This communication principle of course also applies in other network topologies, as is described in FIG. 2 with the example of a star topology. In this case, a star topology is constructed by means of an external network switch SW, wherein a line topology as described in FIG. 1 is realized in each branch. The master M is also connected to the network switch SW. In the example shown, a data packet DP1(m) is transmitted, in the form a summation frame, to all slaves S1 . . . Sn at time $t_M$ at the beginning of each transmission cycle Z. This data packet DP1(m) is forwarded by the network switch SW to the two branches and there is transmitted to all slaves S1 . . . Sn. The other data packets DP are then retransmitted at times $t_{M,x}$, $t_{S,y}$ provided therefor within the transmission cycle Z(m). However, it must be kept in mind that the data packets DP that are returned to the master M by the slaves S1 . . . Sn should preferably be planned such that no data jam can occur in the master M and in the network switch SW therebetween. The time for the data packet DP2(m) from the slave Sn to the master M should be planned, e.g. such that this data packet DP2(m) does not collide with other data packets from the other branch of the star topology, as shown in FIG. 2. For reasons of clarity, data packets DP moving back and forth between master M and network switch SW are depicted only partly in FIG. 2.

The inventive method for asynchronous data communication is explained in the following using FIG. 3. Without limiting generality, in this case a simple linear topology as in FIG. 1 is assumed. The above-described, temporally fixed isochronous data communication takes place in the cyclic segment $t_{zykl}$ of the transmission cycle Z(m). For the asynchronous data communication a request data packet DPa, with which a slave S informs the master M that it wishes to transmit asynchronous data, is now provided in the cyclical segment of the network protocol. In the request data packet DPa the slave simultaneously communicates how much asynchronous data (bytes) it has to send. Of course, in this case a plurality of slaves S can transmit such request data packets DPa in a transmission cycle Z(m). In the example according to FIG. 3, for example, the slaves S2 and Sn transmit such a request data packet DPa.

The master M now collects these request data packets DPa and evaluates them. In this case the master M can also collect and evaluate request data packets DPa of a plurality of successive transmission cycles Z. In this case the evaluation takes place in such a way that the master M calculates which slaves S1 . . . Sn are permitted to transmit their asynchronous data at which time $t_{as}$ within a transmission cycle Z. The master M can plan the available asynchronous time period within the transmission cycle Z precisely, since it knows which data packet sizes the slaves S1 . . . Sn will transmit isochronously and wish to send asynchronously. The priority control, that is to say which slave should transmit data packets DP if there are more requests than available bandwidth, lies entirely with the master M. The priority of the individual asynchronous data packets DP of a slave S are within the responsibility of the slave S itself, i.e. each slave S decides for itself which of its asynchronous data should be transmitted first. The master M processes the requests of each slave S preferably in sequence.

After evaluation of the request, in one of the subsequent transmission cycles Z(m+k) the master M transmits an invitation data packet DPe to the slaves S1 . . . Sn which it invites to transmit asynchronous data. The master M can preferably also transmit the invitation data packet DPe in the immediately next transmission cycle Z(m+1), that is to say k=1, send, after it has received request data packet(s) DPa in the preceding transmission cycle Z(m).

In this case the invitation data packet DPe includes the transmission cycle Z(m+k+l) and the time $t_{as}$ within this transmission cycle Z(m+k+l) when each slave S1 . . . Sn is permitted to transmit its asynchronous data. If after reception of the invitation data packet DPe the asynchronous data are transmitted always in the immediately next transmission cycle Z(m+k+l) or always in the next l-th transmission cycle Z(m+k+l), this information does not necessarily have to be contained in the invitation data packet DPe. In this connection it is advantageous if the asynchronous data are always transmitted in the immediately subsequent transmission cycle Z(m+k+l), that is to say l=1. In this case it is especially advantageously if the asynchronous data are transmitted in the same transmission cycle Z(m+k) in which the invitation data packet DPe was received, that is to say l=0.

In this case the invitation data packet DPe can advantageously be configured as a sum frame (as indicated in FIG. 3) which includes, for each slave S1 . . . Sn, in which transmission cycle Z(m+k+l) and when within this transmission cycle Z(m+k+l) it is permitted to transmit its asynchronous data.

In this case the invitation data packet DPe can be transmitted at an arbitrary (but defined) point in the transmission cycle Z(m+k) and does not necessarily have to be transmitted at the start of a transmission cycle Z(m+k), as illustrated in FIG. 3. In particular, the invitation data packet DPe can also be transmitted in the asynchronous segment $t_{asynch}$ and also at the end of the transmission cycle Z(m+k). Likewise, a plurality of invitation data packets DPe can also be transmitted in one transmission cycle Z(m+k).

In the example according to FIG. 3, in the transmission cycle Z(m+k) at the time $t_{M,1}$ the master transmits the invitation data packet DPe, in this case in the form of a sum frame, with which it informs the slaves S2, Sn in which transmission cycle Z(m+k+l) and at what time $t_{as,2}$, $t_{as,n}$, $t_{as,nn}$ within this transmission cycle Z(m+k+l) they should transmit their required asynchronous data in an asynchronous data packet DPas, in this case asynchronous data packets DPas2, DPasn, DPasnn.

In this case the master M can also inform the slaves S2, Sn how much data should be transmitted asynchronously. Thus a slave S can be asked to transmit only a part of the requested asynchronous data. For the rest of the data the slave S can then transmit a request data packet DPa again. However, information about the quantity of data can also be used for error detection. When a slave S receives an invitation for a data quantity which does not correspond to its request, the slave can assume an error and can send a new request data packet and thus can also signal to the master M that an error has occurred.

In this connection it should be noted that the master M preferably plans the asynchronous data communication in order to prevent collisions with the isochronous data traffic so that in the asynchronous segment $t_{asynch}$ the asynchronous data from the slaves S1 . . . Sn arrive at the receiver, in this case the master M. This means that a slave Sn should also transmit an asynchronous data packet DPasn in the cyclical segment $t_{zyk}$ of the transmission cycle Z(m+k+l), if this leads to no collisions in the Ethernet data network 1, as illustrated in FIG. 3.

Likewise, it is possible that a slave Sn also transmits asynchronous data packets DPasn, DPasnn in a transmission cycle Z(m+k+l) several times, as illustrated in FIG. 3, if this is feasible within the available asynchronous bandwidth. Thus for example large asynchronous data packets DPas can also be transmitted from a slave S to the master M.

In principle in the Ethernet network protocol data packets DP are also possible, which are to be transmitted from a slave S to a plurality of different network nodes, master M or slaves S1 . . . Sn, a so-called multicast data packet DPmc. The also applies substantially to the asynchronous data communication. However, when planning the asynchronous data communication the master M does not know whether a slave, which has declared a wish for asynchronous data traffic, wishes to transmit a multicast data packet DPmc or wishes to transmit the asynchronous data only to the master M. In the request data packet DPa a slave S1 . . . Sn could now inform the master M that it wishes to transmit a multicast data packet DPmc. Or, in the planning of the asynchronous data communication the master M always considers the possibility of multicast data packets DPmc. In each case the master M plans the asynchronous data communication so that no collisions occur on the Ethernet data network 1.

FIG. 4 shows the transmission of an asynchronous multicast data packet DPmc, wherein the entire prehistory already described, that is to say request data packet DPa and invitation data packet DPe, have been omitted for the sake of simplicity. In this example the master M has planned the time $t_{mc}$ for the multicast data packet DPmc so that no collisions occur in the Ethernet data network 1 and so that the multicast data packet DPmc arrives at the master M in the asynchronous segment $t_{asynch}$ of the transmission cycle Z(m+k+l).

Likewise, naturally, the master M itself can also transmit asynchronous data packets DPasm to the slaves S1 . . . Sn, as illustrated in FIG. 5. Here too the master M must plan the dispatch times $t_{mc}$ of these asynchronous data packets DPasm so that within the asynchronous segment $t_{asynch}$ of the transmission cycle Z(m) they arrive at the receiver, in this case the (or a or a group of) slaves S1 . . . Sn. In this case the asynchronous data packets DPasm of the master M can also be sent within the cyclical segment $t_{zykl}$.

The planning of the asynchronous data traffic could proceed for example as follows in the master M.

If the master M knows that all slaves S1 . . . Sn only wish to transmit asynchronous data packets DPas to it and there is no data traffic between the slaves S1 . . . Sn (without master M), it is sufficient to calculate the transmission times $t_{as}$ of the asynchronous data packets DPas of the slaves S1 . . . Sn so that, taking into account the known topology-dependent transit times of the asynchronous data packets DPas through the Ethernet data network 1, these data packets arrive at the master M if possible without a gap. Since the master M knows the isochronous communication in the cyclical segment $t_{zykl}$, it has a list with free time slots within a transmission cycle Z(m+k+l) which it can plan for asynchronous data traffic.

In all other cases the master M must check on all connections of the known network topology whether at the transit time of the asynchronous data packet DPas, DPasm no other synchronous or asynchronous data packet DP is already planned in the same direction, and if appropriate must move the asynchronous data packet DPas, DPasm correspondingly in terms of time.

These calculations of the transit times are very simple arithmetic tasks (essentially transit times are added) which can be calculated in the master M simply and without great computing costs, since the master M knows the network topology and the individual transit times on the connections between the network nodes.

The master M can also take into account a maximum size of an asynchronous data packet DPas, DPasm. The maximum size results from the fact that a data packet DPas, DPasm should only be so great that this asynchronous data packet DPas, DPasm can be transmitted in a transmission cycle Z from any network node to any other network node. Potentially an asynchronous data packet DPas, DPasm must also be distributed over a plurality of data packets if the asynchronous data to be transmitted are too large.

By means of request data packets DPa the slaves S1 . . . Sn can request asynchronous transmission slots from the master M until by means of invitation data packets DPe they actually receive from the master M an allocated transmission slot in a transmission cycle Z. Advantageously the slaves S also transmit a serial number with each request data packet DPa. In this way a slave S can send a plurality of different requests to the master M, even before the invitation for the first asynchronous data packet DPas arrives again at the slave S.

By continuous repetition of all requests which are still open the master M and the slave S are capable of recognizing errors and, if appropriate, starting the request/invitation sequence again, for example after a number of unsuccessful attempts.

The invention claimed is:

1. A method for asynchronous data communication in a real-time capable Ethernet data network utilizing at least one master connected, via the Ethernet data network, to a plurality of slaves, the method comprising:
   utilizing real-time Ethernet data communication with a transmission cycle having a predetermined cycle time, wherein the transmission cycle is divided into an isochronous section and an asynchronous section;
   utilizing the real-time Ethernet data communication in the isochronous section such that the at least one master knows which data packet sizes the slaves will transmit isochronously; and
   utilizing the asynchronous section for asynchronous data communication between the at least one master and the plurality of slaves;
   when at least one slave wishes to transmit asynchronous data, sending a request data packet to the at least one master from the at least one slave, wherein the sending occurs within a first transmission cycle and the request data packet indicates how much asynchronous data the at least one slave wishes to transmit asynchronously, and
   after the sending, transmitting an invitation data packet from the at least one master to the at least one slave, said invitation data packet indicating a time within a second transmission cycle at which the at least one slave is permitted to transmit the asynchronous data in an asynchronous data packet,
   wherein the data communication in the isochronous section is planned data communication that occurs cyclically, and
   wherein the data communication in the asynchronous section is planned data communication by the master and occurs non-cyclically.

2. The method according to claim 1, wherein the second transmission cycle is one of multiple transmission cycles that follow the first transmission cycle.

3. The method according to claim 2, wherein the invitation data packet indicates which of the multiple transmission cycles the at least one slave is permitted to transmit the asynchronous data in the asynchronous data packet.

4. The method according to claim 1, wherein the asynchronous data packet is transmitted and the invitation data packet is received in a one transmission cycle.

5. The method according to claim 1, wherein the asynchronous data packet is transmitted in a transmission cycle that immediately follows the second transmission cycle.

6. The method according to claim 1, wherein the invitation data packet indicates how much asynchronous data the at least slave should transmit.

7. The method according to claim 1, further comprising detecting an error in the real-time Ethernet data communication when there is a deviation between data quantity of the asynchronous data requested from the at least one slave and data quantity of the asynchronous data communicated by the at least one master.

8. The method according to claim 1, wherein the request data packet is transmitted in the isochronous section of the first transmission cycle.

9. The method according to claim 1, wherein the request data packet comprises a plurality of request data packets.

10. The method according to claim 1, further comprising transmitting a plurality of request data packets by the at least one slave in a transmission cycle that follows the first transmission cycle.

11. The method according to claim 1, wherein the second transmission cycle immediately follows the first transmission cycle.

12. The method according to claim 1, wherein the first and second transmission cycles are a same transmission cycle.

13. The method according to claim 1, wherein the invitation data packet comprises a plurality invitation data packets.

14. The method according to claim 1, further comprising, during the first transmission cycle, transmitting an asynchronous data packet from the at least one master to at least one slave.

15. The method according to claim 1, further comprising detecting an error in the real-time Ethernet data communication when, after the sending, the at least one slave does not receive an invitation data packet.

16. A method for asynchronous data communication in a real-time capable Ethernet data network, the method comprising:
- connecting at least one master, via the Ethernet data network, to a plurality of slaves;
- utilizing real-time Ethernet data communication with a transmission cycle having a predetermined cycle time, wherein the transmission cycle is divided into an isochronous section and an asynchronous section;
- utilizing the real-time Ethernet data communication in the isochronous section such that the at least one master knows which data packet sizes the slaves will transmit isochronously; and
- utilizing the asynchronous section for asynchronous data communication between the at least one master and the plurality of slaves;
- when at least one slave wishes to transmit asynchronous data, sending at least one request data packet to the at least one master from the at least one slave, wherein the request data packet indicates to the at least one master how much asynchronous data the at least one slave wishes to transmit asynchronously, and
- after the sending, transmitting an invitation data packet from the at least one master to the at least one slave, said invitation data packet indicating a time within the transmission cycle at which the at least one slave is permitted to transmit the asynchronous data in an asynchronous data packet,
- wherein the data communication in the isochronous section is planned data communication that occurs cyclically, and
- wherein the data communication in the asynchronous section is planned data communication by the master and occurs non-cyclically.

17. A method for asynchronous data communication in a real-time capable Ethernet data network, the method comprising:
- connecting at least one master, via the Ethernet data network, to a plurality of slaves;
- utilizing real-time Ethernet data communication with a transmission cycle having a predetermined cycle time, wherein the transmission cycle is divided into an isochronous section and an asynchronous section;
- utilizing the real-time Ethernet data communication in the isochronous section such that the at least one master knows which data packet sizes the slaves will transmit isochronously; and
- utilizing the asynchronous section for asynchronous data communication between the at least one master and the plurality of slaves;
- when at least one slave wishes to transmit asynchronous data, sending, within a first transmission cycle, at least one request data packet to the at least one master from the at least one slave, wherein the request data packet indicates to the at least one master how much asynchronous data the at least one slave wishes to transmit asynchronously, and
- transmitting, within a following transmission cycle, an invitation data packet from the at least one master to the at least one slave, said invitation data packet indicating a time within the second transmission cycle at which the at least one slave is permitted to transmit the asynchronous data in an asynchronous data packet,
- wherein the data communication in the isochronous section is planned data communication that occurs cyclically, and
- wherein the data communication in the asynchronous section is planned data communication by the master and occurs non-cyclically.

\* \* \* \* \*